United States Patent [19]

Yamaguchi et al.

[11] Patent Number: 5,075,183
[45] Date of Patent: Dec. 24, 1991

[54] LEAD ACID STORAGE BATTERY

[75] Inventors: Osamu Yamaguchi; Hideki Hikawa; Yoshinari Morimoto, all of Tokyo, Japan

[73] Assignee: Shin-Kobe Electric Machinery Co., Ltd., Tokyo, Japan

[21] Appl. No.: 685,681

[22] Filed: Apr. 16, 1991

[30] Foreign Application Priority Data

Apr. 18, 1990 [JP] Japan .................................. 2-102154

[51] Int. Cl.⁵ ............................................ H01M 2/14
[52] U.S. Cl. .................................. 429/139; 429/142; 429/144; 429/225
[58] Field of Search ............... 429/136, 139, 142, 144, 429/131, 247, 252, 225

[56] References Cited

U.S. PATENT DOCUMENTS

| | | | |
|---|---|---|---|
| 2,010,498 | 8/1935 | Smith | 429/142 X |
| 2,511,887 | 6/1950 | Vinal | 429/144 |
| 2,635,127 | 4/1953 | Yardney et al. | 429/139 |
| 3,997,366 | 12/1976 | Davis, Jr. | 429/144 |
| 4,396,691 | 8/1983 | Wheadon | 429/136 |
| 4,552,823 | 11/1985 | Wozniak | 429/139 X |
| 4,664,994 | 5/1987 | Koike et al. | 429/225 X |

*Primary Examiner*—Anthony Skapars
*Attorney, Agent, or Firm*—Wegner, Cantor, Mueller & Player

[57] ABSTRACT

A lead acid storage battery comprises a group of electrode plates, wherein a negative plate is enclosed in an enveloped separator joined together at its both edges by welding or mechanical sealing and a glass mat is separately provided between the separator and a positive plate, the glass mat having a width at least equal to the width of the separator except its both edges.

2 Claims, 5 Drawing Sheets

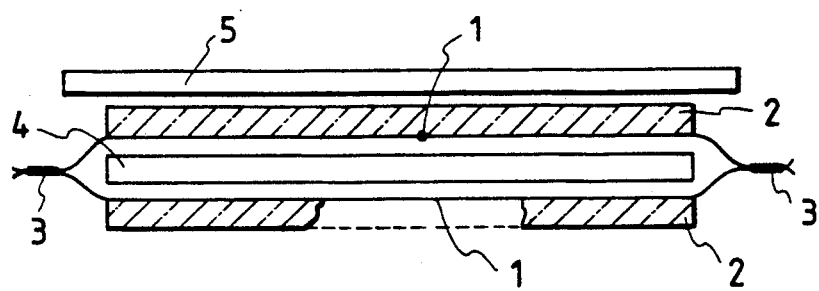
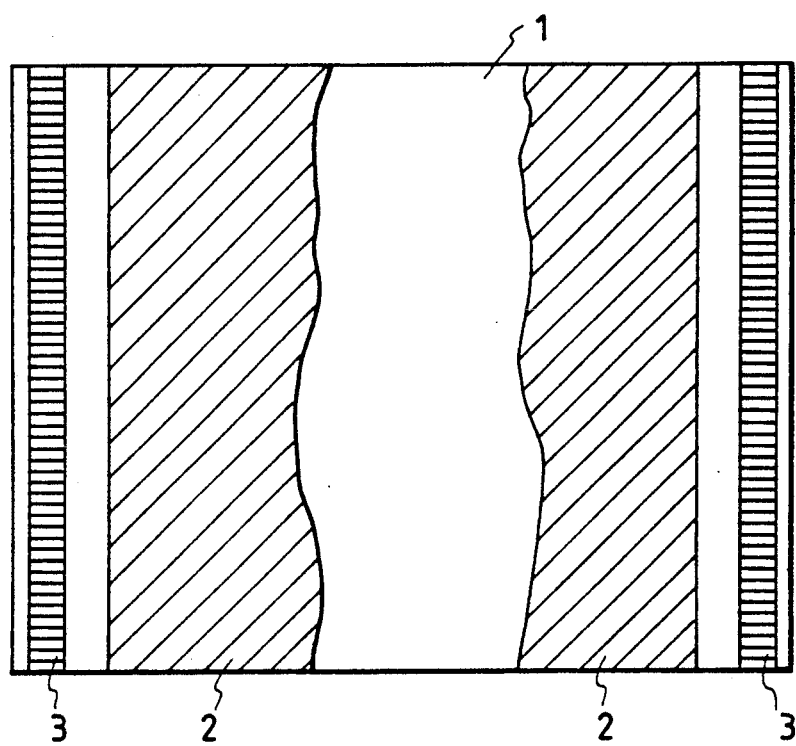

LEAD ACID STORAGE BATTERY

BACKGROUND OF THE INVENTION

The present invention concerns improving the performance of lead acid storage batteries.

So far, lead acid storage batteries each comprised a stack of a positive plate or plates and a negative plate or plates with a separator plates or plates located therebetween. Used to this end where separators provided with glass mats, now generally referred to as a planar type of separators. Another type of separators, recently introduced in the art, have been made of such synthetic resins as polyethylene. Owing to their thinness, the polyethylene separators have the merits of being lower in electrical resistance and better in oxidation resistance than the conventional separators.

In use, the polyethylene separator, shown at 1 in FIG. 5, is longitudinally folded together with a glass mat 2 pre-laminated thereon, defining an envelope. The envelope is then joined together at its both edges 3 by welding or mechanical seals. However, if the glass mat should extend to the welds 3, welding or mechanical sealing would be unfeasible. For this reason, a glass mat smaller in width than the welds 3 of the separator, i.e. a glass mat having a width such that its widthwise edges do not reach the welds 3 is now used in combination with the separator 1. In FIG. 5, reference numeral 4 stands for a negative plate enclosed in the enveloped separator 1 and 5 stands for a positive plate.

With such a narrow glass mat, however, the positive plate 5 would be curved into contact with the polyethylene separator as depicted in FIG. 6, while the lead acid storage battery is used under severe conditions, deteriorating due to oxidation. At this portion shown at IS, there will be a short-circuit between the positive and negative plates 5 and 4.

With the foregoing in mind, the present invention have been accomplished to extend the service life of a lead acid storage battery constructed with an enveloped separator made of polyethylene or other synthetic resin.

SUMMARY OF THE INVENTION

According to this invention, the above-mentioned object is achieved by the provision of a lead acid storage battery comprising a group of electrode plates, wherein a negative plate is enclosed in a polyethylene enveloped separator joined together at its both edges by welding or mechanical sealing and a glass mat is separately provided between said separator and a positive plate, said glass mat having a width at least equal to the width of said separator except its both its edges.

In one embodiment of this invention, the glass mat may be equal in width to the separator.

By locating the glass mat according to this invention, it is unlikely that in use, the positive plate may be curved into contact with the negative plate, whereby the service life of the positive plate can be increased.

BRIEF DESCRIPTION OF THE DRAWINGS

FIG. 5 shows a conventional lead acid storage battery, (a) and (b) being top and front views, respectively;

DETAILED EXPLANATION OF THE INVENTION

Figure 1A:
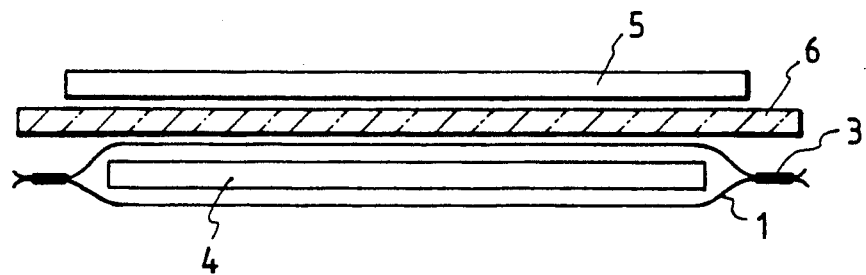
FIG. 1 shows one embodiment of the lead acid storage battery according to this invention, (a) and (b) being top and front views, respectively.
Figure 1B:
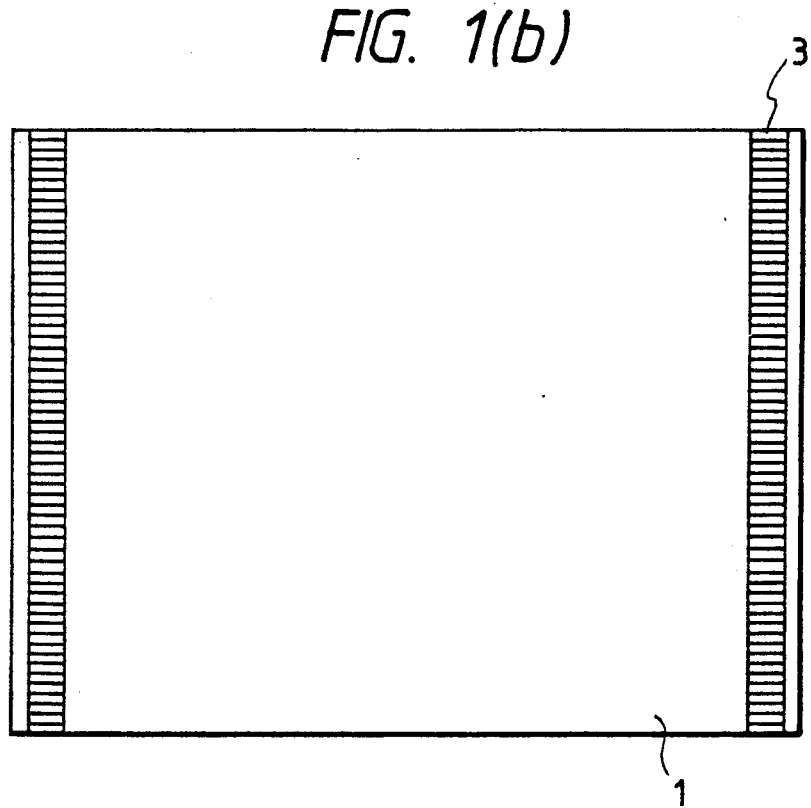

Referring first to FIG. 1, there is shown one battery $A_1$ according to this invention, with a glass mat 6 located in it. As illustrated, the glass mat 6 having a width equal to that of a polyethylene enveloped separator 6 is separately provided between the separator 6 and a positive plate 5.

Figure 2A:
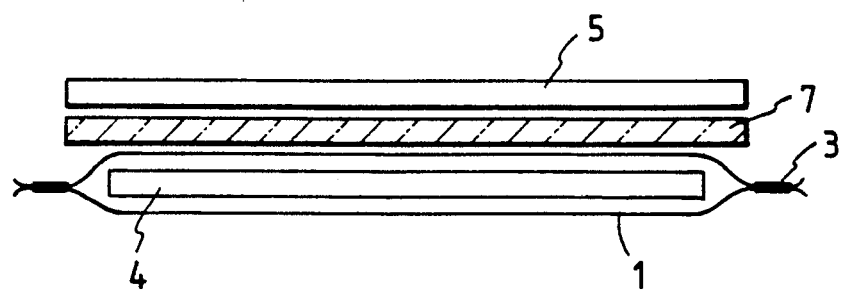
FIG. 2 shows another embodiment of the lead acid storage battery according to this invention, (a) and (b) being top and front views, respectively.
Figure 2B:
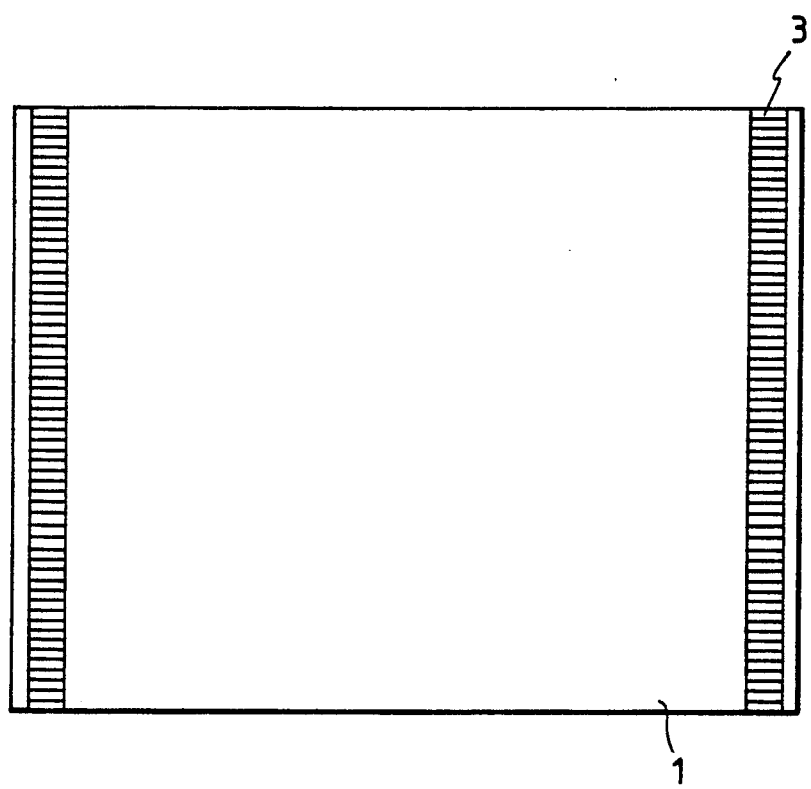

Referring then to FIG. 2, there is shown another battery $a_2$ according to this invention, with a glass mat 7 located in it. The glass mat 7 having a width smaller than the polyethylene enveloped separator 1 by the magnitude of its both edges to be joined together is separately provided between the separator 1 and a positive plate 5.

Figure 3:
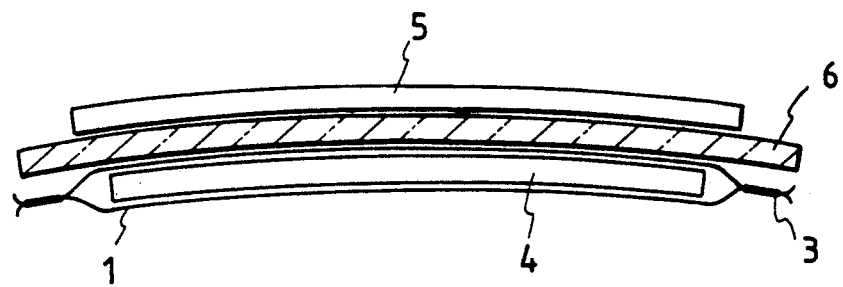
FIG. 3 is an illustration of what condition the first embodiment is in after use.
Figure 4:
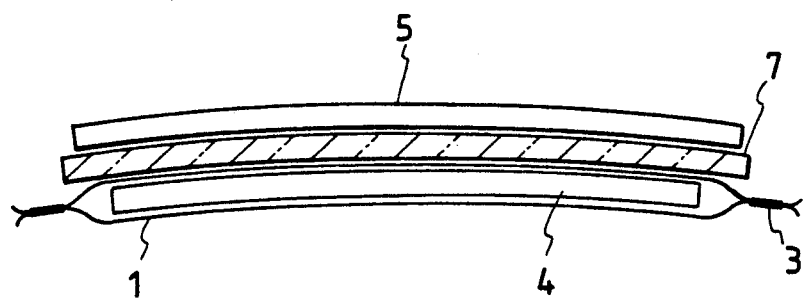
FIG. 4 is an illustration of what condition the second embodiment is in after use.
Figure 6:
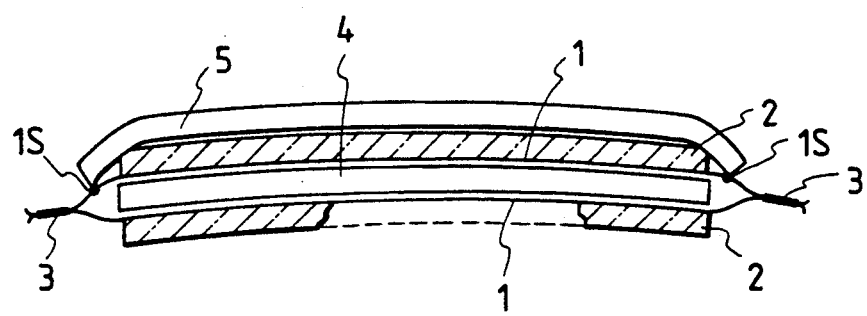
FIG. 6 is an illustration of what condition the conventional example is in after use.

With the instant batteries $A_1$ and $A_2$, there is no possible short-circuit between the positive and negative plates 4 and 5. This is because, as illustrated in FIGS. 3 and 4, the glass mats 6 and 7 are located all over the surfaces of the positive and negative plates 4 and 5, even when the positive plates 5 are curved while they are used under severe conditions.

In what follows, the instant batteries will be compared in terms of service life with a conventional battery B in which, as shown in FIG. 5, the glass mats are integrally placed over a polyethylene enveloped separator except its both edges, all having a capacity of 12V, 5HR and 48Ah.

Endurance test was performed at 75c with charging at 14.8 V for 10 minutes and discharging at 25 A for 4 minutes.

Figure 7:
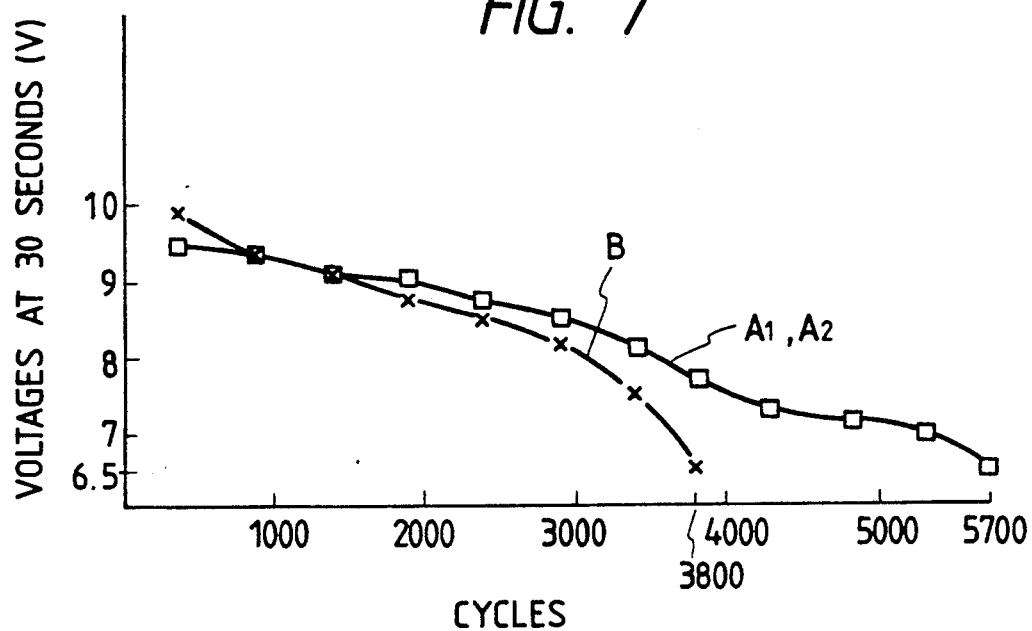
FIG. 7 is characteristic curves showing how the voltages of the instant and conventional batteries vary at 30 seconds during endurance test.

FIG. 7 shows how the discharge voltages of the batteries vary at 30 seconds.

It can be seen from FIG. 7 that the instant batteries $A_1$ and $A_2$ show a 50% increase in terms of service life, as compared with the conventional battery B.

Thus, the present invention is effective for extending the service life of batteries.

What is claimed is:

1. A lead acid storage battery comprising a group of electrode plates, wherein a negative plate is enclosed in an enveloped separator joined together at its both edges by welding or mechanical sealing and a glass mat is separately provided between said separator and a positive plate, said glass mat having a width at least equal to the width of said separator except its both edges.

2. A lead acid storage battery as claimed in claim 1, wherein said glass mat is equal in width to said separator.

* * * * *